United States Patent
McGowan et al.

(10) Patent No.: US 10,165,499 B2
(45) Date of Patent: Dec. 25, 2018

(54) BEAM SET OPERATION IN A WIRELESS NETWORK NODE

(71) Applicant: Telefonaktiebolaget LM Ericsson (publ), Stockholm (SE)

(72) Inventors: Neil McGowan, Stittsville (CA); Marthinus Willem Da Silveira, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/328,678

(22) PCT Filed: Jul. 25, 2014

(86) PCT No.: PCT/IB2014/063433
§ 371 (c)(1),
(2) Date: Jan. 24, 2017

(87) PCT Pub. No.: WO2016/012844
PCT Pub. Date: Jan. 28, 2016

(65) Prior Publication Data
US 2017/0215127 A1    Jul. 27, 2017

(51) Int. Cl.
*H04M 1/00*    (2006.01)
*H04W 48/10*    (2009.01)
*H04W 16/28*    (2009.01)
*H04W 48/12*    (2009.01)
*H04J 11/00*    (2006.01)

(52) U.S. Cl.
CPC .......... *H04W 48/10* (2013.01); *H04W 16/28* (2013.01); *H04W 48/12* (2013.01); *H04J 11/00* (2013.01)

(58) Field of Classification Search
CPC ..... H04W 72/04; H04W 76/02; H04W 28/16; H04W 16/10; H04W 16/14; H01Q 1/246
USPC ...................... 455/450, 458, 562.1
See application file for complete search history.

(56) References Cited

U.S. PATENT DOCUMENTS

| 6,141,335 A | 10/2000 | Kuwahara et al. |
| 2006/0164969 A1* | 7/2006 | Malik .............. H04B 7/0408 370/203 |
| 2014/0003369 A1 | 1/2014 | Josiam et al. |

OTHER PUBLICATIONS

International Search Report for International application No. PCT/IB2014/063433—dated Sep. 26, 2014.

* cited by examiner

*Primary Examiner* — Temica M Beamer
(74) *Attorney, Agent, or Firm* — Baker Botts, LLP (57) ABSTRACT

In some embodiments, a network node uses beam frames to broadcast acquisition information on a plurality of beam sets (N). Each beam sets includes a plurality of beams (K). The network node broadcasts the acquisition information one beam set at a time during a corresponding one of a periodic plurality (X) of the beam frames. The periodic plurality (X) of beam frames occur with a first periodicity and are within a periodic plurality (Y) of subframes occurring with a second periodicity.

28 Claims, 10 Drawing Sheets

BEAM SET OPERATION IN A WIRELESS NETWORK NODE

PRIORITY

This non-provisional application is a U.S. National Stage Filing under 35 U.S.C. § 371 of International Patent Application Serial No. PCT/IB2014/063433 filed Jul. 25, 2014, and entitled "Beam Set Operation in a Wireless Network Node."

TECHNICAL FIELD

The present disclosure relates, in general, to wireless networks and, more particularly, to beam set operation in a wireless network node.

BACKGROUND

A wireless network node uses an antenna to exchange signals with wireless devices. To improve capacity, the wireless network node may be configured with multiple antennas per sector, such as 2, 4, or 8 antennas. The spectrum available for the antennas may be limited. For example, for frequencies between 0.05 to 3 GHz, spectrum is typically allocated in 20 to 70 MHz bands, and the bands are typically licensed and shared among many operators in blocks from 5 to 20 MHz. Frequency reuse is typically set to one, which means that all spectrum is reused in all sectors/sites. Using a high number of antennas in a limited spectrum environment tends to create interference due to the spatial reuse of the spectrum. The interference limits the data rates of the system and degrades system performance.

The demand for larger capacity and higher data rates in wireless communication systems necessitates the need for wider bandwidth and significant additional spectrum. This is available only at higher frequencies than currently in use. In order to transmit and receive at higher frequencies, beamforming is needed in order to achieve reasonable link budgets.

SUMMARY

Existing standards typically transmit the initial acquisition information over the full cell and may use beamforming for traffic channels to increase capacity, However, in order to satisfy the link budgets at higher frequencies (such as 5 GHz and above), in practice beamforming can provide significant benefit when applied on the initial access channels. Therefore an appropriate spatial structure to partition the cell in space is useful. As a result particular embodiments of this disclosure propose a structure with a time split corresponding to spatial partitioning and does so in a way that maintains hierarchical structural timing features.

In some embodiments, a network node uses beam frames to broadcast acquisition information on a plurality of beam sets (N). Each beam sets includes a plurality of beams (K). The network node broadcasts the acquisition information one beam set at a time during a corresponding one of a periodic plurality (X) of the beam frames. The periodic plurality (X) of beam frames occur with a first periodicity and are within a periodic plurality (Y) of subframes occurring with a second periodicity.

In some embodiments, the first periodicity is equal to a duration of one subframe and the second periodicity is equal to a duration of the periodic plurality (Y) of subframes. The periodic plurality (Y) of subframes may correspond to Long Term Evolution (LTE) subframes and, in some embodiments, each beam frame of the periodic plurality (X) of beam frames includes a plurality of symbols arranged in a symbol configuration that corresponds to a symbol configuration of a corresponding LTE subframe of the LTE subframes. In some embodiments, the periodic plurality (X) of beam frames may occur within each one of the periodic plurality (Y) of subframes in some embodiments. In some embodiments, each beam frame in a period of the periodic plurality (X) of beam frames has a beam frame configuration based on a configuration of a particular subframe of the periodic plurality (Y) of subframes.

The acquisition information may comprise at least one of a physical broadcast channel (PBCH) and a synchronization signal, such as a primary synchronization signal and/or a secondary synchronization signal, and is used for initial system access. The acquisition information includes LTE acquisition information in some embodiments. The acquisition information may be broadcast simultaneously on each beam (K) of the given beam set. In some embodiments, the acquisition information is broadcast in each of the beam frames (X) of a predetermined set of subframes.

The number of beam sets in the plurality of beam sets (N) may be different than a number of beam frames in the plurality (X) of beam frames. In some embodiments, the network node uses another plurality of beam sets (NN) each comprising a plurality of beams (K). For each beam set, the network node broadcasts acquisition information during a corresponding one of another periodic plurality (XX) of beam frames. The other periodic plurality (XX) of beam frames is interleaved in time with the periodic plurality (X) of beam frames such that the periodic plurality (X) of beam frames occurs within one period of the periodic plurality (Y) of subframes and the other periodic plurality (XX) of beam frames occurs within another period of the periodic plurality (Y) of subframes.

In some embodiments, a symbol time is scaled by a factor of 1/X relative to an existing symbol time. The bandwidth is scaled by X such that subcarrier frequency spacing is scaled by X relative to existing subcarrier frequency spacing.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

A wireless network node may be configured with a number of antennas to improve capacity. The antennas transmit directional signals or beams distributed throughout the coverage area. In some embodiments of the present disclosure, the beams may be configured in beam sets. A beam set includes a subset of beams that simultaneously broadcast acquisition information, such as synchronization signals, reference signals and/or broadcast channel information.

The beams assigned to a particular beam set may be selected based on the direction that each beam points. Selecting beams pointed in different directions allows for spatial separation with minimal overlap of the beams. Thus, when a beam broadcasts the acquisition information, it does not create significant interference for the other beams of the beam set broadcasting at the same time. Because each beam set transmits only during its designated time, each spatial portion of the spectrum emits little energy most of the time. This maximizes the possibility of serving cell edge users with minimal co-channel interference. Cells may be coordinated when they serve cell edge users to minimize overlapping spatial transmissions that tend to create co-channel interference.

As mentioned above, beam sets may be configured to transmit acquisition information one beam set at a time. This means that there are times when a beam set does not transmit the acquisition information. The present disclosure makes use of a beam frame structure which defines the timing or scheduling of the beam sets. In certain embodiments, the beam frame structure is based on a subframe structure, such as the subframe structure defined by LTE or other standards, whereby during the equivalent of a subframe (e.g., an LTE subframe), the acquisition information is broadcast in multiple beam sets (one beam set at a time). In other words, the subframe (i.e., the time duration of a subframe) may be viewed as being "partitioned" into beam frames. The network node transmits the acquisition information in a first beam set during the first beam frame, a second beam set during a second beam frame, and so on.

In general, the beam frame structure of the present disclosure can be based on any existing or future subframe configuration or other portion of a frame structure which, by definition, repeats itself over time or is periodic. Because a subframe is known to be the smallest piece of scheduled transmission that can be modulated/demodulated on its own, one advantage of defining the beam frames based on a (periodic) subframe structure is that the modulation/demodulation timing associated with of the subframe structure can be maintained through the beam frames. Throughout the present disclosure, the terms "subframe" and "beam frame" will be used primarily for clarity and brevity but it is understood that other terms could to be used to denote a portion of a frame structure that has the above characteristics. Similarly, the term "beam frame" could also be substituted by other terms that represent how transmissions of the beam sets might be timed relative to a frame structure as described above. For example, the "beam frames" could themselves be referred to as "subframes" forming part of a frame structure that repeats itself over time.

Further, the present disclosure refers to the LTE subframe structure but it is understood that this is only an example. Any subframe structure of any existing or future Radio Access Technologies (RAT) could be used. For example, any subframe structure that might be developed as an evolution to LTE or LTE-A as part of 5G developments might be used.

A subframe may comprise a number of symbols. Partitioning the subframe into beam frames may include shortening the symbol time based on a scaling factor. The scaling factor may be determined based on the number of beam frames per subframe. For example, if the subframe is partitioned into X beam frames, the symbol time may be shortened by a scaling factor of X. The symbol time may be shortened to be consistent with the channel coherence time and to increase the bandwidth of a subcarrier and resource block. In some embodiments, a scaled variant of LTE is defined for spectrum above 5 GHz. At higher frequencies the spatial fading characteristics tend to shrink, so it is necessary to shrink the time scale appropriately. In general, the frame structure may be maintained at higher frequencies, however, the sub-carrier bandwidth may increase by factor X and the symbol time decreases by factor X.

The beam sets facilitate initial access by a wireless device and provide a low overhead method of helping the wireless network node determine the direction of the wireless device. For example, each beam set may have a unique identification on the sync/broadcast channels, and the access timing of a wireless device links to one of the beam sets. The wireless network node determines the beam within the beam set based on uplink reception of the wireless device. Having determined the direction of the wireless device, the wireless network node aligns the beam with the wireless device using beamforming. Significant beamforming may be needed for the wireless network node and the wireless device at higher frequencies, such as frequencies above 5 GHz.

From a spatial beamforming perspective, the wireless network node would like to know the direction of the wireless device. On the downlink, this may involve wireless device specific sounding with wireless device feedback. On the uplink, this may involve wireless device specific sounding with wireless network node feedback. Calibration may be done to determine the direction that the wireless device is pointing. The calibration may be driven by the wireless network node and/or may use a codebook scheme. A spatial relationship between the uplink and downlink as a function of location should be estimated (calibrated) over time. In some embodiments, the wireless device may also have the ability to transmit and receive in various spatial directions.

Figure 1:
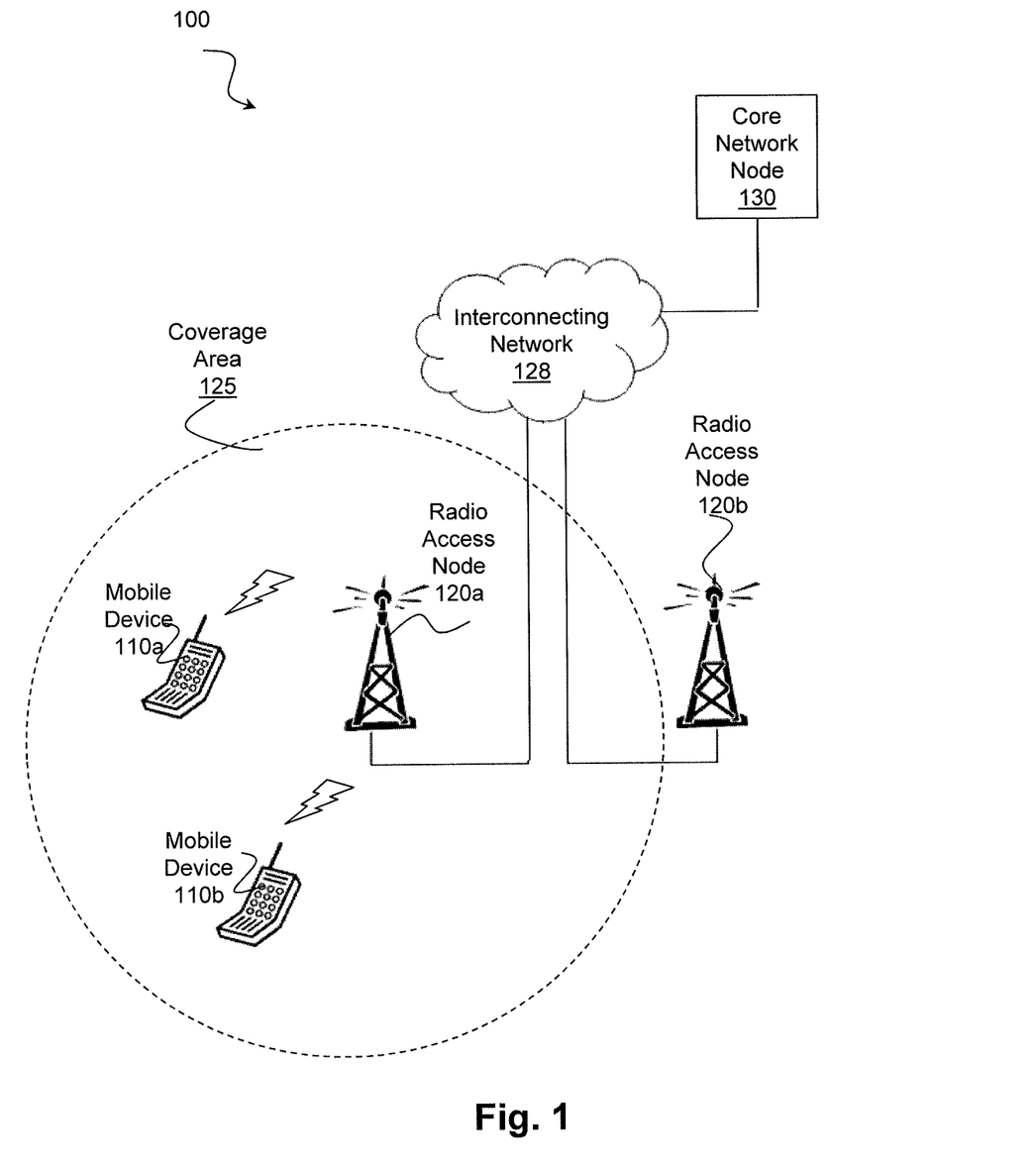
FIG. 1 illustrates a block diagram of a wireless network according to one embodiment of the present disclosure.

FIG. 1 illustrates a block diagram of a wireless network according to one embodiment of the present disclosure. The network nodes include wireless network nodes 120 (such as a base station or eNodeB) and core network nodes 130. Wireless network node 120 may be configured with a plurality of antennas that provide wireless communication within a coverage area 125. For simplicity, FIG. 1 illustrates an example in which wireless network node 120a defines a single coverage area 125. In other embodiments, wireless network node 120a may define multiple coverage areas 125 if, for example, wireless network node 120a is partitioned into sectors.

Wireless device 110a within coverage area 125 communicates with wireless network node 120a over a wireless interface. Wireless device 110a transmits wireless signals to wireless network node 120a and/or receives wireless signals from wireless network node 120a. The wireless signals contain voice traffic, data traffic, and control signals, for example. Core network node 130 manages the establishment of communication sessions and various other functionality for wireless device 110. The network nodes connect through interconnecting network 128, which refers to any interconnecting system capable of transmitting audio, video, signals, data, messages, or any combination of the preceding. Examples of wireless network node 120 and wireless device 110 are described with respect to FIGS. 10 and 11, respectively.

Figure 2:
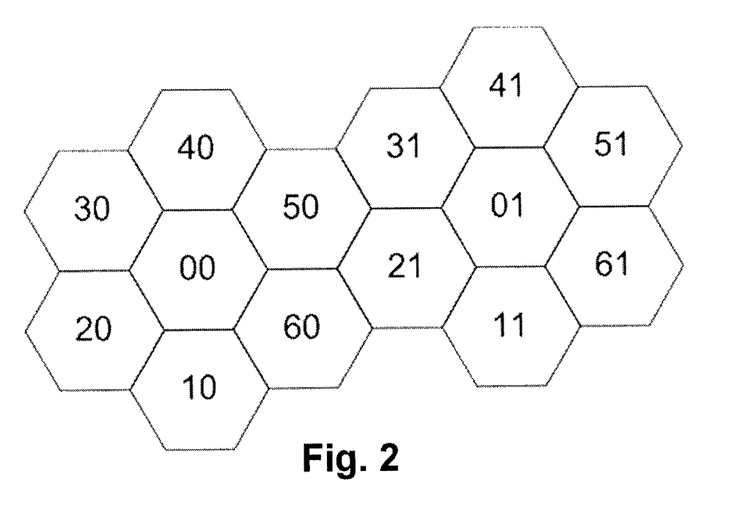
FIG. 2 illustrates a beam set configuration according to one embodiment of the present disclosure.

Wireless network node 120a may be configured with multiple antennas at its transmitter and/or a receiver. The use of multiple antennas may boost the capacity and coverage of wireless network node 120a. The multi-antenna configuration uses the spatial dimension of the communication channel to improve performance by transmitting several information carrying signals, or beams, in various geographical directions. The beams may be arranged in beam sets. A beam set may refer to a set of beams that transmits simultaneously. FIG. 2 illustrates a beam set configuration according to one embodiment of the present disclosure. In FIG. 2, coverage area 125 of wireless network node 120a is partitioned into N beam sets (BS), and each beam set comprises K beams. The example embodiment of FIG. 2 shows N=7 beam sets and K=2 beams per beam set. The beams are numbered as [beam set N] [beam K], where N=0, 1, 2, 3, 4, 5, or 6 and K=0 or 1.

Figure 3:
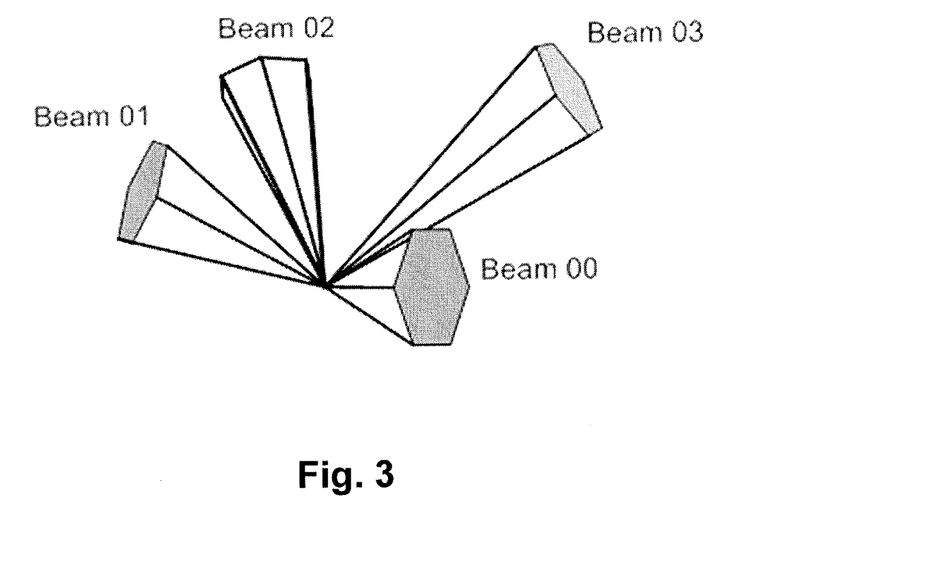
FIG. 3 illustrates a configuration of the beams in a beam set according to one embodiment of the present disclosure.

FIG. 3 illustrates a configuration of the beams in a beamset according to one embodiment of the present disclosure. In the example embodiment of FIG. 3, beam set 0 comprises four beams (e.g., K=0, 1, 2, or 3). The beams K of beam set 0 may be simultaneously transmitted. The beams K may be selected for inclusion in beam set 0 based on sufficient spatial separation of the beams. As illustrated, the beams K of beam set 0 are generally pointed in different directions.

Figure 4:
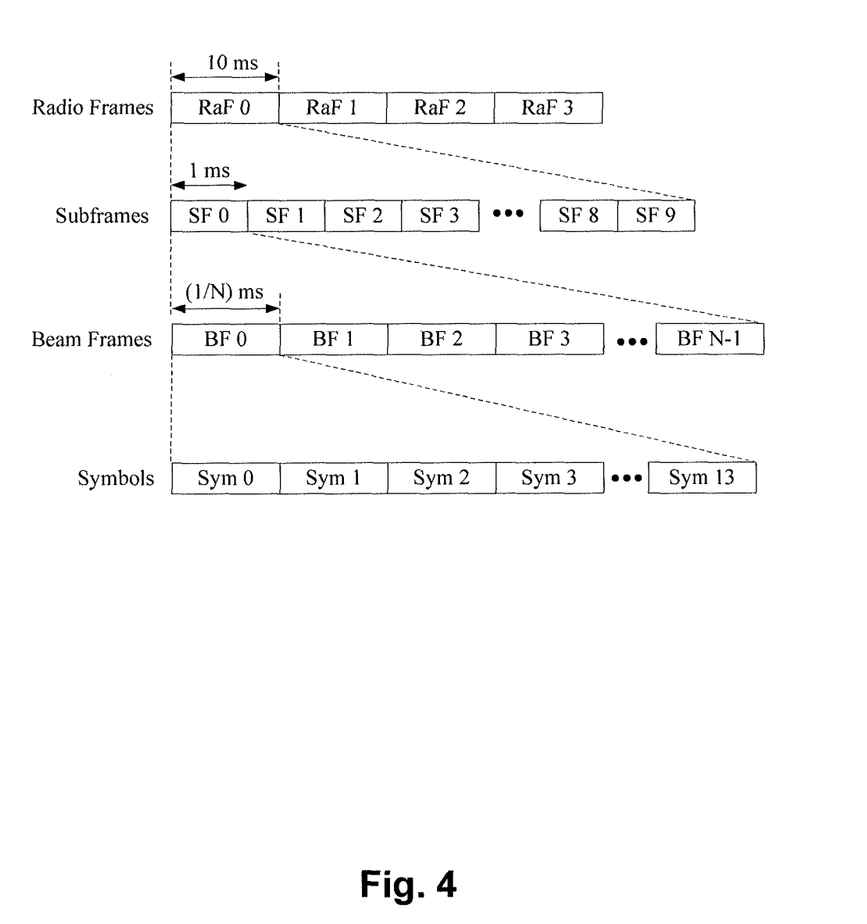
FIG. 4 illustrates a block diagram of frames used by a wireless network node according to one embodiment of the present disclosure.

FIG. 4 illustrates a block diagram of frames used by wireless network node 120 according to one embodiment of the present disclosure. Wireless network node 120 transmits signals organized in some form of a frame structure. As an example, in LTE, wireless network node 120 may transmit signals organized in radio frames having a duration of 10 ms, and each radio frame may be made up of ten subframes, each of 1 ms duration. A subframe may refer to the smallest portion of a scheduled transmission that can be transmitted and demodulated on its own. That is, the information required to demodulate a subframe may be self-contained within the subframe such that the subframe can be demodulated without outside information.

In existing LTE systems, each subframe comprises 2 slots of 0.5 ms duration and each slot comprises 7 symbols (i.e., a subframe comprises 2×7=14 symbols). Each symbol may carry information, such as traffic or acquisition information. Acquisition information may refer to information used by wireless device 110 to acquire service on wireless network node 120. Examples of acquisition information include a physical broadcast channel or a synchronization signal. Existing LTE systems transmit simultaneously on all beams of the cell. This approach tends to create interference and degrade system performance.

Embodiments of the present disclosure may reduce such interference by transmitting acquisition information on one beam set at a time. For example, wireless network node 120 transmits on beam set 0 during beam frame 0, beam set 1 during beam frame 1, and so on. FIG. 4 illustrates an example in which the number of beam frames per subframe X is equal to the number of beam sets N. However, in other embodiments, the number of beam frames per subframe X may be less than the number of beam sets N or greater than the number of beam sets N.

Any suitable duration may be used for the beam frame. In certain embodiments where the number of beam sets N equals the number of beam frames per subframe X, the duration of the beam frame may be determined by dividing the subframe duration by the number of beam sets N to be accommodated in the subframe. For example, a 1 ms subframe divided by N beam sets yields a 1/N ms beam frame duration. In certain alternative embodiments, a subframe may include a pre-determined number of beam frames, each of pre-determined duration. If the number of beam frames in a subframe exceeds the number of beam sets to which acquisition information is to be transmitted during that subframe, one or more of the beam frames may have a null beam set with no acquisition information transmission. If the number of beam frames per subframe is less than the total number of beam sets, interleaving may be used to broadcast the acquisition information on each beam set, as further described with respect to FIG. 8 below.

The radio frame and subframe timing may be independent of the choice of N to remain consistent with exiting radio frame and subframe timing, such as 10 ms per radio frame and 1 ms per subframe in LTE. The beam frame structure in certain embodiments may be analogous to the subframe structure in existing systems. For example, the beam frame may comprise 14 symbols analogous to the subframe structure in existing LTE systems.

Figure 5:
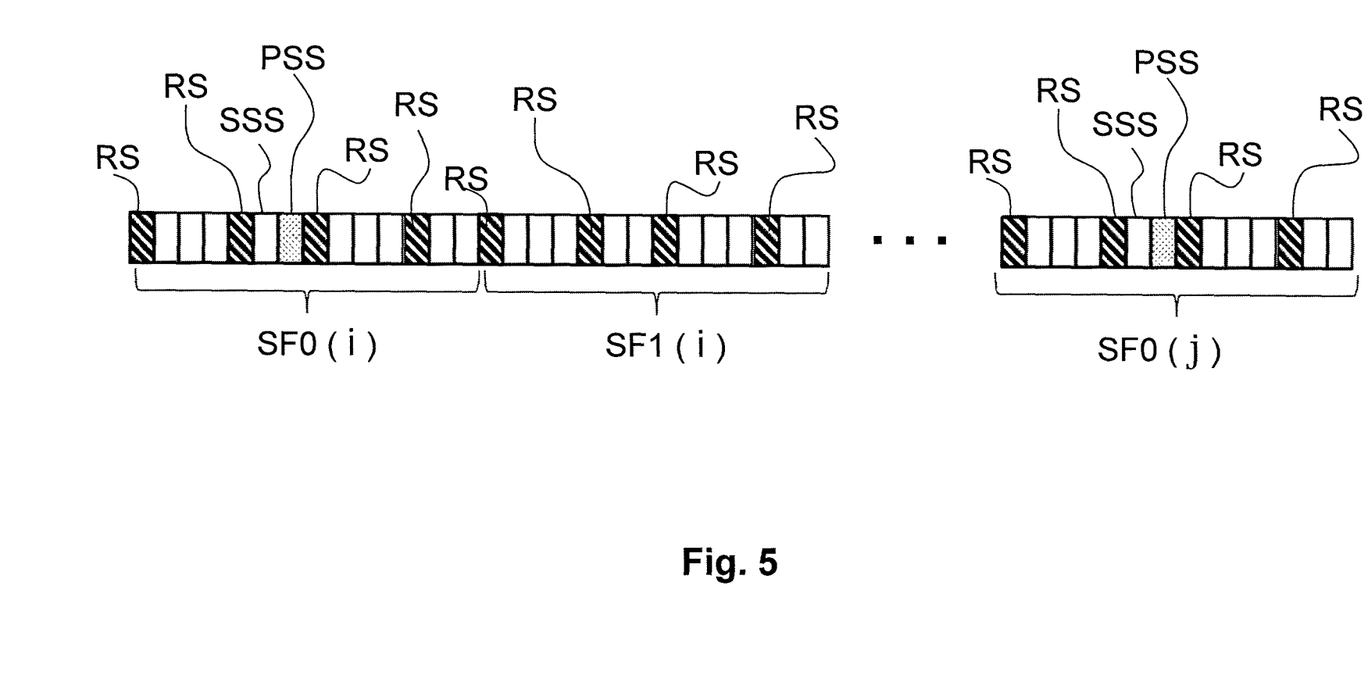
FIG. 5 illustrates a block diagram of a subframe structure according to one embodiment of the present disclosure.

In some embodiments, beam frames may be transmitted with a first periodicity within subframes having a second periodicity, as further described below. In particular, FIG. 5 illustrates a block diagram of a subframe structure according to one embodiment of the present disclosure. In some embodiments, wireless network node 120 transmits ten subframes, each of 1 ms duration, during a 10 ms first period (i). The subframes of the first period (i) include SF0(i), SF1(i), SF2(i), SF3(i), SF4(i), SF5(i), SF6(i), SF7(i), SF8(i), and SF9(i). Wireless network node 120 also transmits ten subframes, each of 1 ms duration, during a second 10 ms period (j). The subframes of second period (j) include SF0(j), SF1(j), SF2(j), SF3(j), SF4(j), SF5(j), SF6(j), SF7(j), SF8(j), and SF9(j).

Within a period, such as period (i), the structure of information to be transmitted may be the same or different from one subframe to the next. FIG. 5 illustrates an example where the structure corresponding to SF0(i) (the first subframe of the first period) is configured with a reference signal (RS) for each of symbols 0, 4, 7, and 11, traffic for symbols 1, 2, 3, 8, 9, 10, 12, and 13, a secondary synchronization signal (SSS) for symbol 5, and a primary reference signal (PSS) for symbol 6. The structure configured for SF0(i) may be used by its corresponding beam frames, as further described with respect to FIG. 6A below.

In FIG. 5, the structure corresponding to SF1(i) (the second subframe of the first period) has a different configuration that SF0(i). In the example SF1(i) is configured with an RS for each of symbols 0, 4, 7, and 11 and traffic for symbols 1, 2, 3, 5, 6, 8, 9, 10, 12, and 13. In the example, SF1($i$) is not configured with an SSS or PSS. The structure configured for SF1($i$) may be used by its corresponding beam frames, as further described with respect to FIG. 6B below.

From one period to the next, the structure of information to be transmitted on a corresponding subframe may be the same. FIG. 5 illustrates an example where the first subframe in the first period (SF0($i$)) and the first subframe in the second period (SF0($j$)) are configured the same. Both SF0($i$) and SF0($j$) are configured with RS for symbols 0, 4, 7, and 11, traffic for symbols 1, 2, 3, 8, 9, 10, 12, and 13, an SSS for symbol 5, and a PSS for symbol 6. Like SF0($i$), the structure configured for SF0($j$) may be used by its corresponding beam frames (as shown in FIG. 6A below).

Although not shown, the second subframe in the second period (SF1($j$)) would be configured the same as the second subframe in the first period (SF1($i$)), with an RS for each of symbols 0, 4, 7, and 11 and traffic for symbols 1, 2, 3, 5, 6, 8, 9, 10, 12, and 13. Like SF1($i$), the structure configured for SF1($j$) may be used by its corresponding beam frames (as shown in FIG. 6B below).

The above description of subframes SF0($i$), SF1($i$), SF0($j$), and SF1($j$) is provided for purposes of example and explanation to show the relationship between the structure of an LTE subframe (according to the LTE standard) and the structure of a subframe of the present disclosure (such as a high-frequency LTE (HLTE) subframe). While some signals/channels and some of the details of those signals/channels have been provided, other variants are possible. For example, the symbol location of the RS is just an example of one possible format within LTE and not all details of the RS are shown. The RS may also be in other symbols and is generally a function of the transmit mode such as single input multiple output (SIMO), 2×2 multiple input multiple output (MIMO), 4×4 MIMO, etc. The details of an LTE subframe are specified in the standard and known to those skilled in the art. Each HLTE subframe may include control channels, shared channels, or other channels analogous to the subframes of the LTE standard.

Figure 6A:
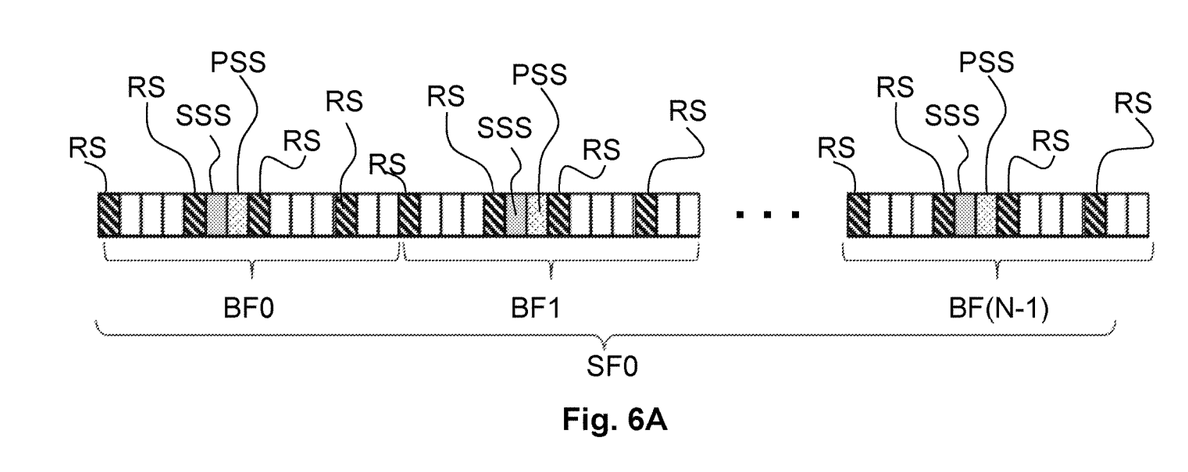
FIGS. 6A-6B illustrate block diagrams of beam frame structures corresponding to the subframe structure of FIG. 5 according to one embodiment of the present disclosure.
Figure 6B:
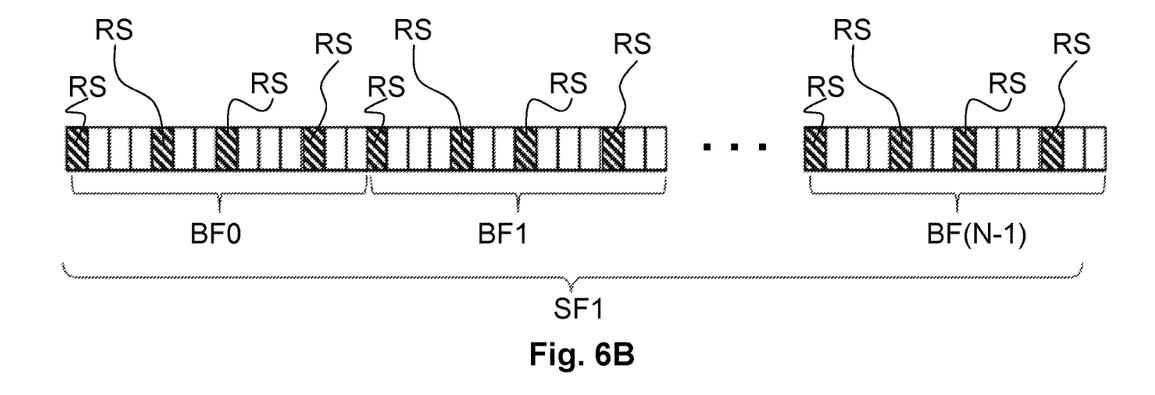

FIGS. 6A-6B illustrate block diagrams of beam frame structures corresponding to the subframe structure of FIG. 5 according to one embodiment of the present disclosure. For simplicity, FIGS. 6A-6B illustrate examples where the number of beam frames X per subframe equals the number of beam sets N such that each subframe comprises N beam frames BF0, BF1, . . . BF(N−1). In other embodiments, N may be greater than X or N may be less than X. The beam frames within a subframe may each have the same structure, and the beam frames from one subframe to the next may have the same structure or different structures.

FIG. 6A illustrates an example of beam frames corresponding to the first subframe (SF0) of FIG. 5. Each beam frame BF0, BF1, . . . BF(N−1) of subframe SF0 has the same structure as the one described with respect to subframe SF0 of FIG. 5 (RS for symbols 0, 4, 7, and 11, traffic for symbols 1, 2, 3, 8, 9, 10, 12, and 13, an SSS for symbol 5, and a PSS for symbol 6). During the first beam frame BF0 of SF0, acquisition information may be transmitted on a first beam set (such as a beam set comprising a beam that faces north, a beam that faces east, a beam that faces south, and a beam that faces west), during the second beam frame BF1 of SF0, acquisition information may be transmitted on a second beam set (such as a beam set comprising a beam that faces northeast, a beam that faces southeast, a beam that faces southwest, and a beam that faces northwest), and so on. The structure of SF0 may be repeated according to the periodicity of the subframes such that the beam frames of subframe SF0($i$) have the same structure as the beam frames of subframe SF0($j$).

FIG. 6B illustrates an example of beam frames corresponding to the second subframe (SF1) of FIG. 5. Each beam frame BF0, BF1, . . . BF(N−1) of subframe SF1 has the same structure as described with respect to subframe SF1 of FIG. 5 (RS for symbols 0, 4, 7, and 11 and traffic for symbols 1, 2, 3, 5, 6, 8, 9, 10, 12, and 13). Collectively, FIGS. 6A and 6B illustrate an example in which the structure of the beam frames within one subframe (SF0) differs from the structure of the beam frames within another subframe (SF1).

The description of beam frames in FIGS. 6A-6B is provided for purposes of example and explanation to show the relationship between the structure of an LTE subframe (according to the LTE standard) and the structure of a beam frame of the present disclosure (such as a high-frequency LTE (HLTE) beamframe). While some signals/channels and some of the details of those signals/channels have been provided, other variants are possible. The details of an LTE subframe are specified in the standard and known to those skilled in the art. Each HLTE beamframe may include control channels, shared channels, or other channels analogous to corresponding subframes of the LTE standard.

Figure 7:
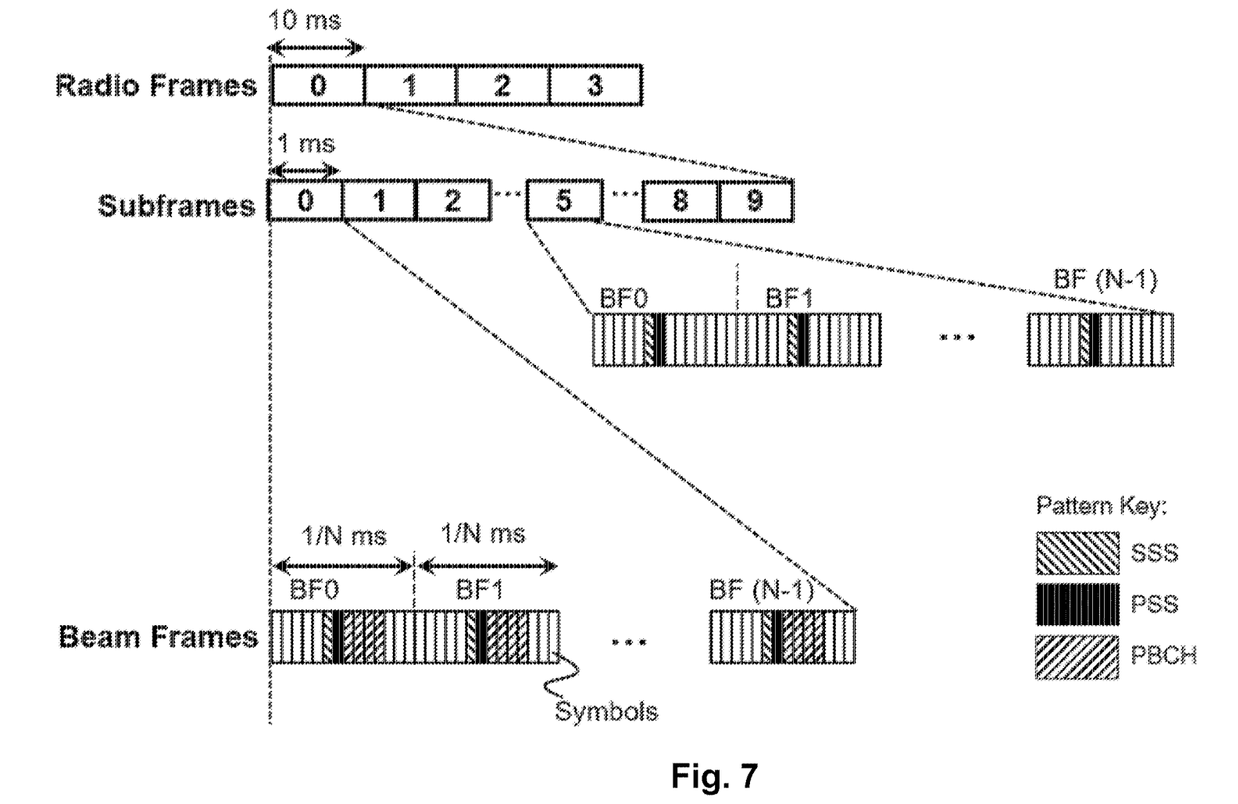
FIG. 7 illustrates a block diagram of frames used by a wireless network node according to one embodiment of the present disclosure.

FIG. 7 illustrates a block diagram of frames used by wireless network node 120 according to one embodiment of the present disclosure. In the example of FIG. 7, wireless network node 120 transmits radio frames, each of 10 ms duration. Each radio frame comprises ten subframes, each of 1 ms duration. The structure of the subframes repeats from one radio frame to the next. For simplicity, FIG. 7 illustrates an example where the number of beam frames X per subframe equals the number of beam sets N such that each subframe comprises N beam frames, each of 1/N ms duration. Within a particular subframe, the structure of the beam frame repeats from one beam frame to the next. For example, beam frames BF0, BF1, and BF(N−1) of subframe SF0 each use symbol 5 for an SSS, symbol 6 for a PSS, and symbols 7-10 for a Physical Broadcast Channel (PBCH). In the example, beam frames BF0, BF1, and BF(N−1) of subframe SF5 each use symbol 5 for an SSS and symbol 6 for a PSS. For simplicity, the RS signals are not shown in FIG. 7. The configuration of SSS, PSS, and PBCH illustrated in FIG. 7 is provided for purposes of example and explanation. In some embodiments, each beam frame may be configured in a manner analogous to a corresponding LTE subframe. Details of LTE subframes are specified in the standard and known to those skilled in the art.

Figure 8:
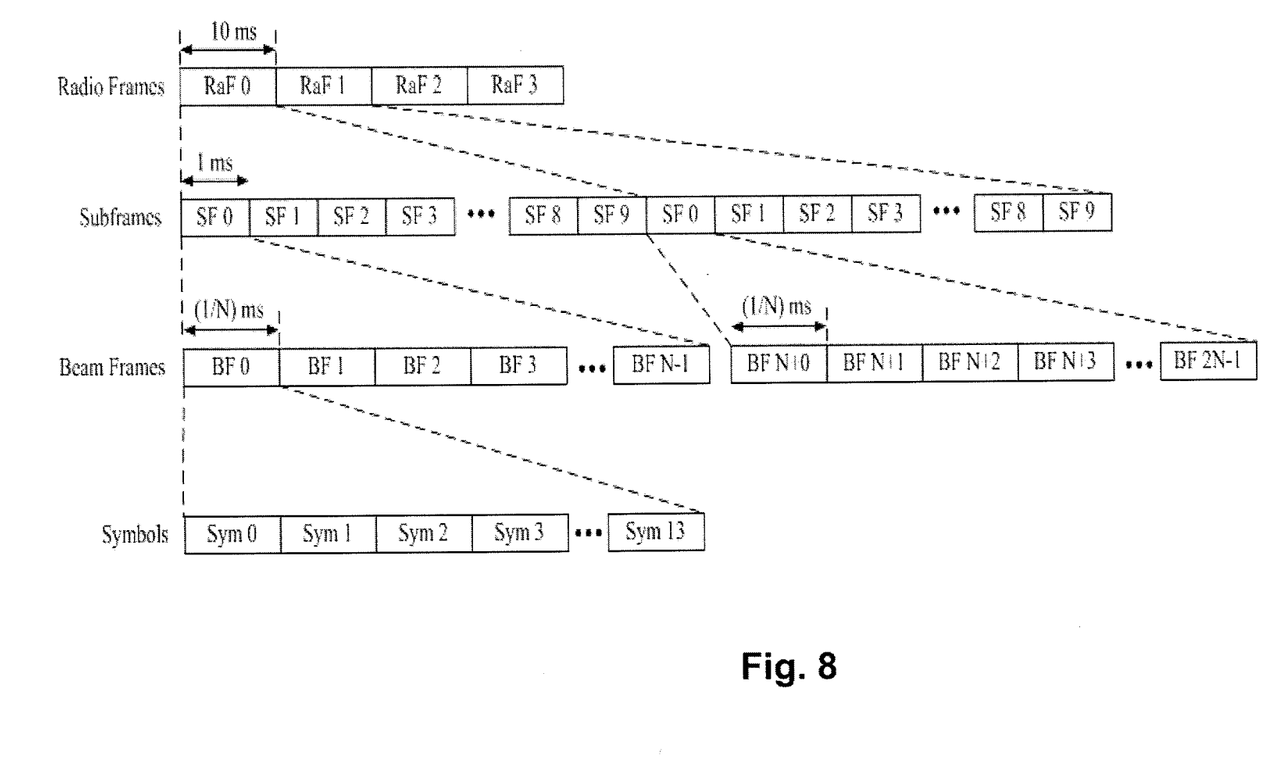
FIG. 8 illustrates a block diagram that shows interleaving of beam frames associated with multiple groups of beam sets according to one embodiment of the present disclosure.

FIG. 8 illustrates a block diagram for interleaving beam frames associated with multiple groups of beam sets according to one embodiment of the present disclosure. In FIG. 8, the number of beam sets N exceeds the number of beam frames X per subframe. For example, the number of beam frames per subframe may be X and the number of beam sets may be M*X. As an example, suppose that the number of beam sets=10 (e.g., beam sets A, B, C, D, E, F, G, H, I, and J) and that wireless network node 120 accommodates X=5 beam frames per subframe such that two subframes are needed to cover all the beam sets (M=2).

Wireless network node 120 may interleave a first group of beam sets (A, B, C, D, E) and a second group of beam sets (F, G, H, I, J) by interleaving their corresponding beam frames during different periods of the subframe structure. For example, the duration of the first subframe SF0 in the first radio frame RaF0 can be used for the first group of beam sets and the duration of the first subframe SF0 in the second radio frame RaF1 can be used for the second group of beam sets. Thus, subframe 0 of radio frame 0 may be used to transmit beam set A in beam frame 0, beam set B in beam frame 1, beam set C in beam frame 2, beam set D in beam frame 3, and beam set E in beam frame 4. Subframe 0 of radio frame 1 may be used to transmit beam set F in beam frame 5, beam set G in beam frame 6, beam set H in beam frame 7, beam set I in beam frame 8, and beam set J in beam frame 9. The structure for subframe 0 may be the same in both radio frame 0 and radio frame 1. For example, if a reference signal is transmitted on symbol 1 of the beam frames within the first radio frame's subframe 0 (RaF0, SF0 used for beam sets A-E), a reference signal is also transmitted on symbol 1 of the beam frames within the second radio frame's subframe 0 (RaF1, SF0 used for beam sets F-J).

Although the example described above describes a scenario where the number of beam sets N exceeds the number of beam frames X per subframe, it is important to note that other beam set/bream frame configurations are contemplated by the present disclosure. For example, the number of beam sets N could be lower than the number of beam frames X per subframe. In that scenario, the wireless node would broadcast acquisition information using a number of beam frames that match the number of beam sets but, for the remaining beam frames that do not have a corresponding beam set, the wireless node would not broadcast anything. Alternatively, in that scenario, null or empty beam sets could be used so that the number of beam sets (actual beam sets plus null beam sets) could be equal to the number of beam frames. More generally, the number of beam sets can be configured independently of the number of beam frames.

Figure 9:
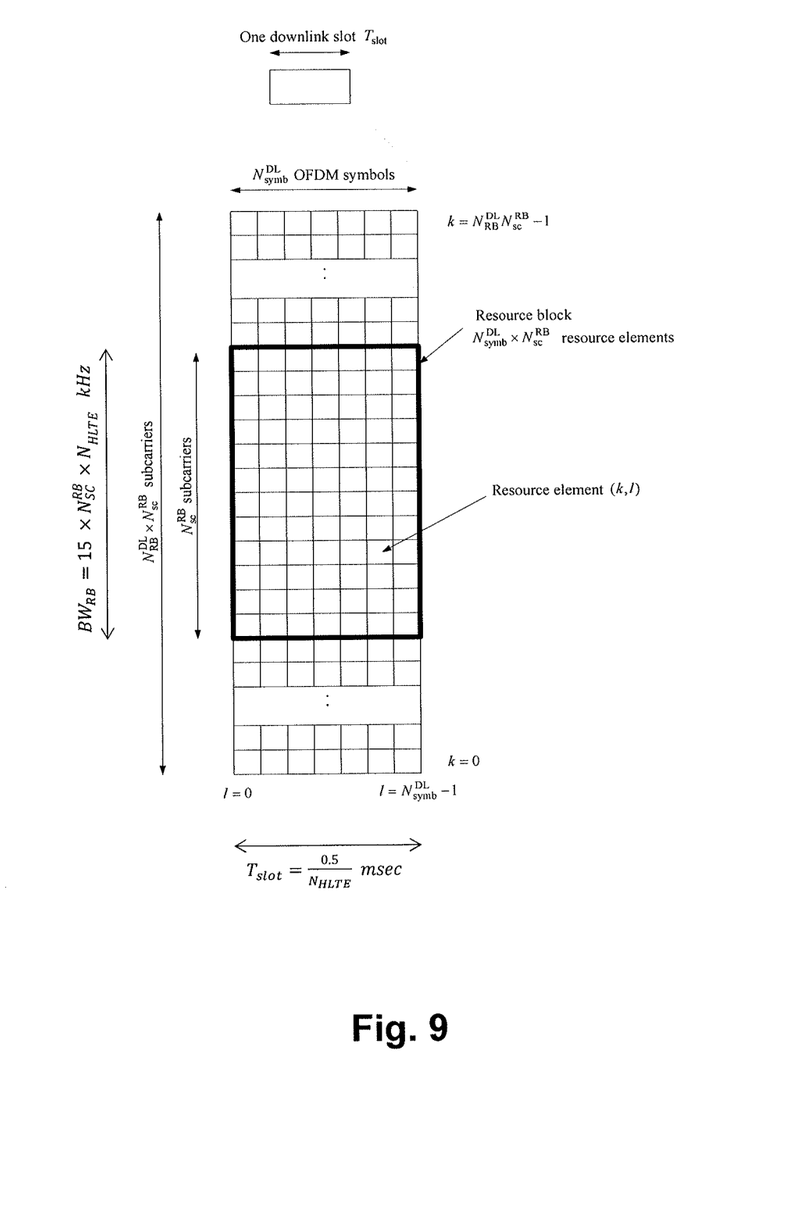
FIG. 9 illustrates a downlink resource grid used by a wireless network node according to one embodiment of the present disclosure.

FIG. 9 illustrates a downlink resource grid used by a wireless network node according to one embodiment of the present disclosure. In the example, the resource block bandwidth $BW_{RB}$ can be determined from the equation $(\Delta f \times N_{SC}^{RB}) \times N_{HLTE}$ kHz, where $\Delta f$ is the LTE sub-carrier spacing, $N_{SC}^{RB}$ is the number of sub-carriers in a resource block, and $N_{HLTE}$ is equal to X as referred to elsewhere in the document. The HLTE slot time duration is $T_{slot} \times 0.5/N_{HLTE}$ milliseconds. The uplink resource grid for HLTE is scaled relative to LTE in the frequency and time domain in the same way as the downlink.

Figure 10:
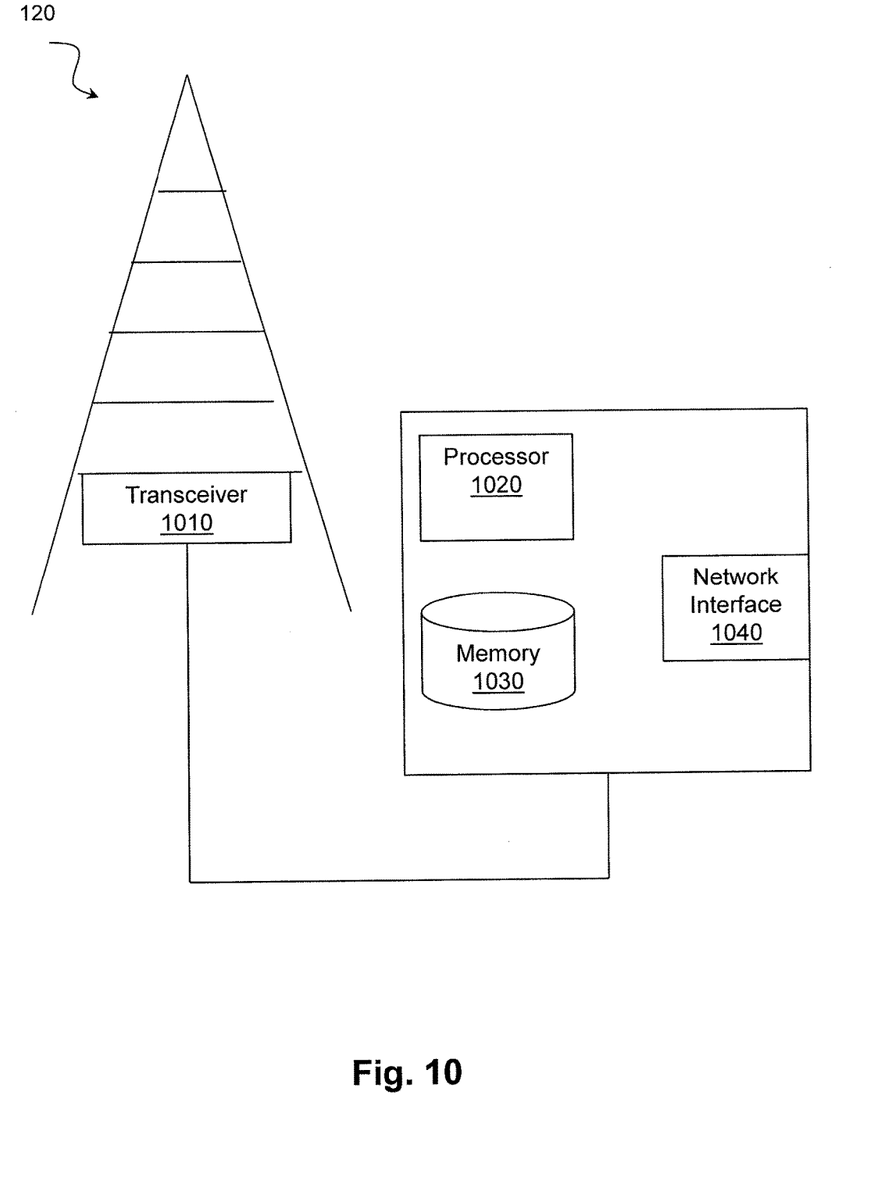
FIG. 10 illustrates a block diagram of the wireless network node described with respect to FIG. 1, according to one embodiment of the present disclosure.

FIG. 10 illustrates a block diagram of the wireless network node 120 described with respect to FIG. 1, according to one embodiment of the present disclosure. Wireless network node 120 can be an eNodeB, a node B, a base station, a wireless access point (e.g., a Wi-Fi access point), a low power node, a base transceiver station (BTS), a transmission point or node, a remote RF unit (RRU), a remote radio head (RRH), or other radio access node. Wireless network node 120 includes at least one transceiver 1010, at least one processor 1020, at least one memory 1030, and at least one network interface 1040. Transceiver 1010 facilitates transmitting wireless signals to and receiving wireless signals from wireless device 110 (e.g., via an antenna); processor 1020 executes instructions to provide some or all of the functionality described above as being provided by a wireless network node 120; memory 1030 stores the instructions executed by processor 1020; and network interface 1040 communicates signals to backend network components, such as a gateway, switch, router, Internet, Public Switched Telephone Network (PSTN), controller, other wireless network nodes 120, and/or core network nodes 130. The processor 1020 and memory 1030 can be of the same types as described with respect to processor 1120 and memory 1130 of FIG. 11 below.

In some embodiments, network interface 1040 is communicatively coupled to processor 1020 and refers to any suitable device operable to receive input for wireless network node 120, send output from wireless network node 120, perform suitable processing of the input or output or both, communicate to other devices, or any combination of the preceding. Network interface 1040 includes appropriate hardware (e.g., port, modem, network interface card, etc.) and software, including protocol conversion and data processing capabilities, to communicate through a network.

Other embodiments of wireless network node 120 include additional components (beyond those shown in FIG. 10) responsible for providing certain aspects of the wireless network node's functionality, including any of the functionality described above and/or any additional functionality (including any functionality necessary to support the solution described above). The various different types of wireless network nodes may include components having the same physical hardware but configured (e.g., via programming) to support different radio access technologies, or may represent partly or entirely different physical components.

Figure 11:
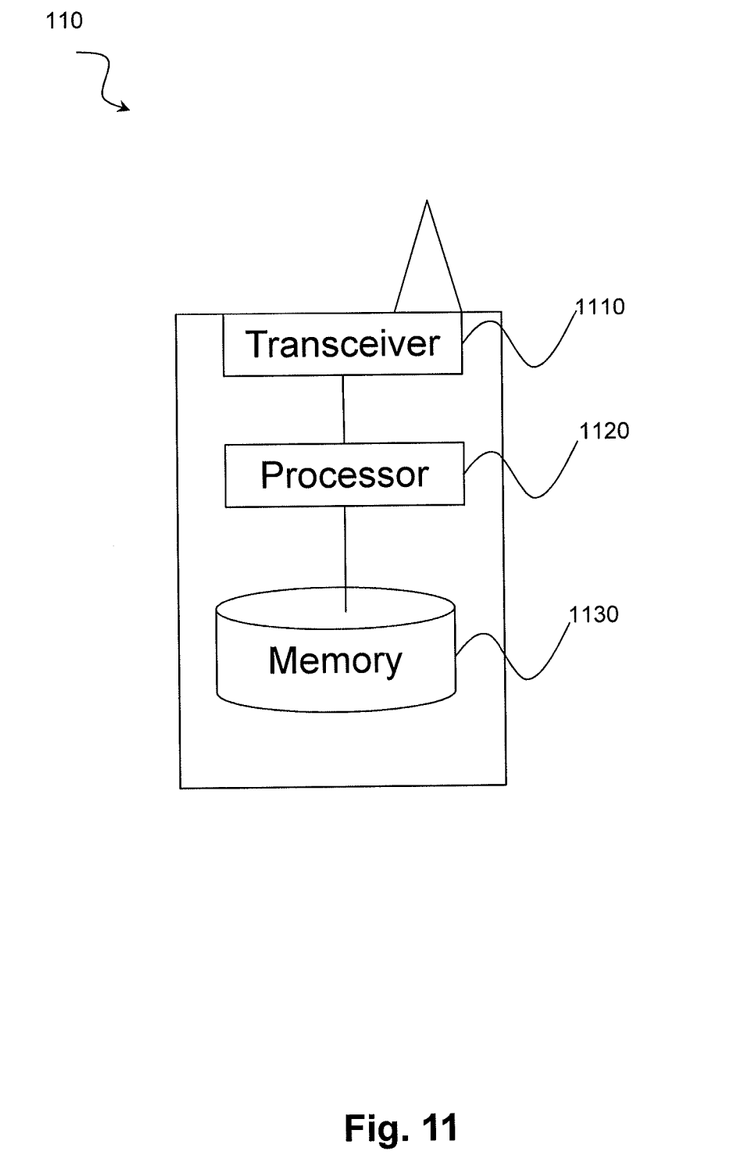
FIG. 11 illustrates a block diagram of the wireless device described with respect to FIG. 1, according to one embodiment of the present disclosure.

FIG. 11 illustrates a block diagram of the wireless device 110 described with respect to FIG. 1 according to one embodiment of the present disclosure. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. Wireless device 110 includes transceiver 1110, processor 1120, and memory 1130. In some embodiments, transceiver 1110 facilitates transmitting wireless signals to and receiving wireless signals from wireless network node 120 (e.g., via an antenna), processor 1120 executes instructions to provide some or all of the functionality described herein as provided by a wireless device 110, and memory 1130 stores the instructions executed by processor 1120.

Processor 1120 includes any suitable combination of hardware and software implemented in one or more integrated circuits or modules to execute instructions and manipulate data to perform some or all of the described functions of wireless device 110. Memory 1130 is generally operable to store computer executable code and data. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 include additional components (beyond those shown in FIG. 11) responsible for providing certain aspects of the wireless device's functionality, including any of the functionality described above and/or any additional functionality (including any functionality necessary to support the solution described above).

As described above, wireless network node 120 provides network access to wireless devices 110 in coverage area 125. Wireless network node 120 comprises a processor 1120 and one or more antennas in a transceiver 1110. Transceiver 1110 is configured to transmit directional signals or beams (K). The beams (K) are grouped in a plurality of beam sets (N), examples of which are shown in FIGS. 1 and 2 above. The beams of a given beam set may transmit acquisition information simultaneously. To minimize interference, the beam sets may be configured with minimal spatial overlap among the beams of a particular beam set.

Processor 1120 in communication with transceiver 1120 broadcasts acquisition information. In some embodiments, acquisition information includes one or more of a physical broadcast channel (PBCH) and a synchronization signal. In some embodiments, transceiver 1120 broadcasts long term evolution (LTE) acquisition information, such as a primary synchronization signal and/or a secondary synchronization signal described in LTE standards.

Processor 1120 in communication with transceiver 1120 broadcasts the acquisition information for each beam set one beam set a time. Broadcasting one beam set at a time may reduce interference among beam sets and therefore improve performance, for example, by providing a better signal to users at the edge of cell 125.

Beam frames may be used to broadcast the information one beam set at a time. For example, during a first beam frame the acquisition information may be transmitted on each beam of a first beam set S(1) without transmitting on any beams of the beam sets S(2) through S(N). During a second beam frame the acquisition information may be transmitted on each beam of a second beam set S(2) without transmitting on any beams of the beam sets S(1) or S(3) through S(N). The acquisition information may be transmitted on each of the remaining beam sets one at a time during a corresponding one of the periodic plurality (X) of beam frames.

Beam frames may be transmitted within a periodic plurality (Y) of subframes used by wireless network node 120. In some embodiments, a subframe may refer to the smallest portion of a scheduled transmission that can be transmitted and demodulated on its own. That is, the information required to demodulate a subframe may be self-contained within the subframe such that the subframe can be demodulated without outside information.

The periodic plurality (X) of beam frames occurs with a first periodicity. The first periodicity may be equal to a duration of one subframe. Within one period, each of the beam frames may have the same structure, examples of which are illustrated in FIG. 6A (for subframe SF0) and FIG. 6B (for subframe SF1). That is, each beam frame in a period of the periodic plurality (X) of beam frames has a beam frame configuration based on a configuration of a particular subframe of the periodic plurality (Y) of subframes. For example, in FIG. 6A, each beam frame in the period defined by subframe SF0 (i.e., BF0 through BF(n−1) of SF0) has a beam frame configuration based on a configuration of a subframe SF0 in FIG. 5. Similarly, in FIG. 6B, each beam frame in the period defined by subframe SF1 (i.e., BF0 through BF(n−1) of SF1) has a beam frame configuration based on a configuration of a subframe SF1 in FIG. 5.

The periodic plurality (Y) of subframes occurs with a second periodicity. The second periodicity is equal to a duration of the periodic plurality (Y) of subframes. As an example, in some embodiments the periodic plurality (Y) of subframes corresponds to LTE subframes having a periodicity of 10 ms during which transceiver 1110 transmits ten subframes each of 1 ms duration. FIGS. 4, 7, and 8 illustrate examples of such subframes.

Each subframe has a corresponding frame structure used by beam frames within that subframe. In some embodiments, the frame structure corresponds to LTE subframes. The LTE subframes include a plurality of symbols arranged in a symbol configuration. FIG. 5 illustrates an example where the LTE subframe includes 14 symbols arranged in a symbol configuration where SF0(i) (the first subframe of the first period) has a reference signal (RS) for each of symbols 0, 4, 7, and 11, traffic for symbols 1, 2, 3, 8, 9, 10, 12, and 13, a secondary synchronization signal (SSS) for symbol 5, and a primary reference signal (PSS) for symbol 6. The symbol configuration is described for example purposes, other sequences of RS, SSS, PSS, and/or traffic could be used. Embodiments where the frame structure corresponds to LTE subframes may use a symbol configuration of a corresponding LTE subframe.

In some embodiments, processor 1120 communicates with transceiver 1110 to broadcast the acquisition information in each of the beam frames (X) of a predetermined set of subframes. As described above, different subframes may define different structures. In the example of FIG. 5, subframe SF0 includes an SSS in symbol 5 and a PSS in symbol 6 whereas subframe SF1 does not include any SSS or PSS. A predetermined set of subframes may be selected to broadcast the acquisition information. As an example, subframes SF0 and SF5 could be selected for broadcasting the acquisition information, and the other subframes could be used for other purposes, such as for sending traffic. Any suitable number and sequence of subframes may be selected to broadcast the acquisition information.

In some embodiments, the periodic plurality (X) of beam frames occurs within each one of the periodic plurality (Y) of subframes. Thus, if the number of beam sets of wireless network node 120 equals X, each beam set of wireless network node 120 may be serviced within one subframe. In embodiments where the number of beam sets of wireless network node is greater than a number of beam frames X per subframe, a first group of the beam sets (N) may be serviced during a first periodic plurality (X) of beam frames and a second group of the beam sets (NN) may be serviced during a second period plurality (XX) of beam frames. The beam frames for the different groups of beam sets (N) and (NN) may be interleaved as illustrated in FIG. 8.

In FIG. 8, transceiver 1110 broadcasts acquisition information during a corresponding one of a first periodic plurality (X) of beam frames with respect to a first group of beam sets (N) (such as beam sets A, B, C, D, and E). For example, during the instance of SF0 within Radio Frame RaF0, transceiver 1110 broadcasts acquisition information to beam set A on BF0, beam set B on BF1, beam set C on BF2, beam set D on BF3, and beam set E on BF4 (i.e., N=5 in the example). Transceiver 1110 broadcasts acquisition information during a corresponding one of a second periodic plurality (XX) of beam frames with respect to a second group of beam sets (NN) (such as beam sets F, G, H, I, and J). For example, during the instance of SF0 within Radio Frame RaF1, transceiver 1110 broadcasts acquisition information to beam set F on BF5, beam set G on BF6, beam set H on BF7, beam set I on BF8, and beam set J on BF9.

The second periodic plurality (XX) of beam frames is interleaved in time with the first periodic plurality (X) of beam frames such that the first periodic plurality (X) of beam frames occurs within one period of the periodic plurality (Y) of subframes (in FIG. 8, the first periodic plurality of beam frames occurs within the period of subframes defined by radio frame RF0) and the second periodic plurality (XX) of beam frames occurs within another period of the periodic plurality (Y) of subframes (in FIG. 8, the second periodic plurality of beam frames occurs within the period of subframes defined by radio frame RF1).

Wireless device 110 may use the acquisition information received in a beam frame to acquire service from wireless network node 120. In some embodiments, wireless device 110 finds the cell ID and frame timing information from the PSS and SSS. The frame timing may be relative to the specific beam frame. Wireless device 110 selects the beamset with the best signal and reads the PBCH for the best beamset using the timing from the corresponding beam frame. In some embodiments, the PBCH includes the parameter M (described with respect to FIG. 8 above) which, together with the number of beam frames X per subframe, defines the total number of beam sets N. Wireless device may also obtain the beam frame number from the PBCH in order to determine the absolute timing of the radio frames.

To connect to wireless network node 120, wireless device 110 may transmit the random access channel (RACH) at the location corresponding to the beam frame number read from the PBCH. Wireless network node 120 receives the RACH attempts from the location corresponding to the best beam set. Once the RACH attempt is received by wireless network node 120 it will know the wireless device 110's beam set. Wireless device 110 determines the initial channel quality indication (CQI) based on the common RS obtained from the beam frames corresponding to the best beam set. For a 1 ms subframe comprising X beam frames, the beam frame rate is 1/X ms, and the RS pattern repeats inside a beam frame. Some control information may be sent to wireless device 110 in the packet data control channel (PDCCH) of the particular beam frame. Once wireless device 110 is connected, all beam frame times can be used for scheduling traffic.

Some embodiments of the disclosure may provide one or more technical advantages. Some embodiments may benefit from some, none, or all of these advantages. Other technical advantages may be readily ascertained by one of ordinary skill in the art. A technical advantage of some embodiments may increase spatial reuse of spectrum (e.g., space division multiple access or "SDMA") within a wireless network node for increased capacity. Some embodiments may allow wireless devices to efficiently access the network at higher frequencies, such as frequencies above 5 GHz. Use of higher frequencies may address the issue of spectrum availability associated with more widely used lower frequencies. A technical advantage of some embodiments may allow for higher cell edge data rates through minimization of co-channel interference and elimination of inter sector interference.

In some embodiments, a symbol time is scaled by a factor of 1/X relative to an existing symbol time. For example, the beam frame time in an HTLE embodiment may be $(2 \times T_{slot,LTE}/X)$ milliseconds, where $T_{slot,LTE}=0.5$ milliseconds in the case of existing LTE and, in the embodiment, X=the number of beam frames per subframe. The bandwidth may also be scaled by X such that subcarrier frequency spacing is scaled by X relative to existing subcarrier frequency spacing. For example, $\Delta f = X \times \Delta f_{LTE}$ where $\Delta f_{LTE}=15$ kHz in the case of LTE.

In some embodiments, a non-transitory computer readable storage medium comprises instructions that, when executed by a processor, are operable to broadcast acquisition information to a plurality of beam sets (N), each beam set comprising a plurality of beams (K), wherein for each beam set the acquisition information is broadcast during a corresponding one of a periodic plurality (X) of beam frames such that the acquisition information is broadcast one beam set at a time, wherein the periodic plurality (X) of beam frames are within a periodic plurality (Y) of subframes, the periodic plurality (X) of beam frames occurring with a first periodicity and the periodic plurality (Y) of subframes occurring with a second periodicity.

In some embodiments, the first periodicity is equal to a duration of one subframe and wherein the second periodicity is equal to a duration of the periodic plurality (Y) of subframes.

In some embodiments, the acquisition information comprises at least one of a physical broadcast channel (PBCH) and a synchronization signal.

In some embodiments, the periodic plurality (Y) of subframes correspond to LTE subframes.

In some embodiments, the acquisition information comprises a primary synchronization signal and a secondary synchronization signal.

In some embodiments, the instructions are further operable to broadcast the acquisition information in each of the beam frames (X) of a predetermined set of subframes.

In some embodiments, the acquisition information includes LTE acquisition information.

In some embodiments, for a given beam set, the instructions are operable to broadcast the acquisition information simultaneously on each beam (K) of the given beam set.

In some embodiments, the periodic plurality (X) of beam frames occurs within each one of the periodic plurality (Y) of subframes.

In some embodiments, the periodic plurality (Y) of subframes correspond to LTE subframes and each beam frame of the periodic plurality (X) of beam frames includes a plurality of symbols arranged in a symbol configuration that corresponds to a symbol configuration of a corresponding LTE subframe of the LTE subframes.

In some embodiments, each beam frame in a period of the periodic plurality (X) of beam frames has a beam frame configuration based on a configuration of a particular subframe of the periodic plurality (Y) of subframes.

In some embodiments, a number of beam sets of the plurality of beam sets (N) is different than a number of beam frames of the plurality (X) of beam frames.

In some embodiments, the instructions are further operable to use another plurality of beam sets (NN) each comprising a plurality of beams (K), wherein, for each beam set, the method broadcasts acquisition information during a corresponding one of another periodic plurality (XX) of beam frames, and wherein the other periodic plurality (XX) of beam frames is interleaved in time with the periodic plurality (X) of beam frames such that the periodic plurality (X) of beam frames occurs within one period of the periodic plurality (Y) of subframes and the other periodic plurality (XX) of beam frames occurs within another period of the periodic plurality (Y) of subframes.

In some embodiments, a symbol time is scaled by a factor of 1/X relative to an existing symbol time and the bandwidth is scaled by X such that subcarrier frequency spacing is scaled by X relative to existing subcarrier frequency spacing.

Modifications, additions, or omissions may be made to the systems and apparatuses disclosed herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set. Modifications, additions, or omissions also may be made to the methods disclosed herein without departing from the scope of the disclosure. The methods may include more, fewer, or other steps. Additionally, steps may be performed in any suitable order.

The subframes described in this text are used merely as an example in order to further the reader's understanding, and it should be understood that variations in the structure may occur. For example, other embodiments may use different sequences of RS, SSS, PSS, and traffic. A particular subframe may include 0, 1, 2, or more symbols configured with a particular signal type (e.g., RS, SSS, PSS, traffic). For example, a synchronization signal may or may not be included in each subframe depending on the embodiment. In addition, although certain timing has been described for purposes of example and explanation, any suitable duration may be used for radio frames, subframes, beam frames, and symbols. Similarly, any suitable number of beam frames may be transmitted in a subframe, and the number of beam frames per subframe may be less than, equal to, or greater than the number of beam sets configured on the wireless network node.

The above description of the embodiments does not constrain this disclosure. Other changes, substitutions, and alterations are possible without departing from the spirit and scope of this disclosure, as defined by the following claims.

The invention claimed is:

1. A network node for providing network access to wireless devices in a coverage area, the network node comprising:
   a processor; and
   one or more antennas in a transceiver configured to use a plurality of beam sets (N), each of the plurality of beam sets comprising a plurality of beams (K);
   the processor in communication with the transceiver being configured to, for each beam set, broadcast acquisition information during a corresponding one of a periodic plurality (X) of beam frames such that the acquisition information is broadcast one beam set at a time, wherein the periodic plurality (X) of beam frames are within a periodic plurality (Y) of subframes, the periodic plurality (X) of beam frames occurring with a first periodicity and the periodic plurality (Y) of subframes occurring with a second periodicity.

2. The network node of claim 1, wherein the first periodicity is equal to a duration of one subframe and wherein the second periodicity is equal to a duration of the periodic plurality (Y) of subframes.

3. The network node of claim 1, wherein the acquisition information comprises at least one of a physical broadcast channel (PBCH) and a synchronization signal.

4. The network node of claim 1, wherein the periodic plurality (Y) of subframes correspond to LTE subframes.

5. The network node of claim 1, wherein the acquisition information comprises a primary synchronization signal and a secondary synchronization signal.

6. The network node of claim 1, wherein the processor is configured to broadcast the acquisition information in each of the beam frames (X) of a predetermined set of subframes.

7. The network node of claim 1, wherein the acquisition information includes LTE acquisition information.

8. The network node of claim 1, wherein:
   for a given beam set, the processor is configured to broadcast the acquisition information simultaneously on each beam (K) of the given beam set.

9. The network node of claim 1, wherein the periodic plurality (X) of beam frames occurs within each one of the periodic plurality (Y) of subframes.

10. The network node of claim 1, wherein the periodic plurality (Y) of subframes correspond to LTE subframes and each beam frame of the periodic plurality (X) of beam frames includes a plurality of symbols arranged in a symbol configuration that corresponds to a symbol configuration of a corresponding LTE subframe of the LTE subframes.

11. The network node of claim 1, wherein each beam frame in a period of the periodic plurality (X) of beam frames has a beam frame configuration based on a configuration of a particular subframe of the periodic plurality (Y) of subframes.

12. The network node of claim 1, wherein a number of beam sets of the plurality of beam sets (N) is different than a number of beam frames of the plurality (X) of beam frames.

13. The network node of claim 1, wherein the one or more antennas in the transceiver is further configured to use another plurality of beam sets (NN) each comprising a plurality of beams (K), wherein the processor in communication with the transceiver is further configured to, for each beam set, broadcast acquisition information during a corresponding one of another periodic plurality (XX) of beam frames, and wherein the other periodic plurality (XX) of beam frames is interleaved in time with the periodic plurality (X) of beam frames such that the periodic plurality (X) of beam frames occurs within one period of the periodic plurality (Y) of subframes and the other periodic plurality (XX) of beam frames occurs within another period of the periodic plurality (Y) of subframes.

14. The network node of claim 1, wherein:
   a symbol time is scaled by a factor of 1/X relative to an existing symbol time; and
   the bandwidth is scaled by X such that subcarrier frequency spacing is scaled by X relative to existing subcarrier frequency spacing.

15. A method for providing network access to wireless devices in a coverage area, the method comprising:
   broadcasting acquisition information to a plurality of beam sets (N), each beam set comprising a plurality of beams (K), wherein for each beam set the acquisition information is broadcast during a corresponding one of a periodic plurality (X) of beam frames such that the acquisition information is broadcast one beam set at a time, wherein the periodic plurality (X) of beam frames are within a periodic plurality (Y) of subframes, the periodic plurality (X) of beam frames occurring with a first periodicity and the periodic plurality (Y) of subframes occurring with a second periodicity.

16. The method of claim 15, wherein the first periodicity is equal to a duration of one subframe and wherein the second periodicity is equal to a duration of the periodic plurality (Y) of subframes.

17. The method of claim 15, wherein the acquisition information comprises at least one of a physical broadcast channel (PBCH) and a synchronization signal.

18. The method of claim 15, wherein the periodic plurality (Y) of subframes correspond to LTE subframes.

19. The method of claim 15, wherein the acquisition information comprises a primary synchronization signal and a secondary synchronization signal.

20. The method of claim 15, wherein the method broadcasts the acquisition information in each of the beam frames (X) of a predetermined set of subframes.

21. The method of claim 15, wherein the acquisition information includes LTE acquisition information.

22. The method of claim 15, wherein:
for a given beam set, the method broadcasts the acquisition information simultaneously on each beam (K) of the given beam set.

23. The method of claim 15, wherein the periodic plurality (X) of beam frames occurs within each one of the periodic plurality (Y) of subframes.

24. The method of claim 15, wherein the periodic plurality (Y) of subframes correspond to LTE subframes and each beam frame of the periodic plurality (X) of beam frames includes a plurality of symbols arranged in a symbol configuration that corresponds to a symbol configuration of a corresponding LTE subframe of the LTE subframes.

25. The method of claim 15, wherein each beam frame in a period of the periodic plurality (X) of beam frames has a beam frame configuration based on a configuration of a particular subframe of the periodic plurality (Y) of subframes.

26. The method of claim 15, wherein a number of beam sets of the plurality of beam sets (N) is different than a number of beam frames of the plurality (X) of beam frames.

27. The method of claim 15, further comprising:
using another plurality of beam sets (NN) each comprising a plurality of beams (K), wherein, for each beam set, the method broadcasts acquisition information during a corresponding one of another periodic plurality (XX) of beam frames, and wherein the other periodic plurality (XX) of beam frames is interleaved in time with the periodic plurality (X) of beam frames such that the periodic plurality (X) of beam frames occurs within one period of the periodic plurality (Y) of subframes and the other periodic plurality (XX) of beam frames occurs within another period of the periodic plurality (Y) of subframes.

28. The method of claim 15, wherein:
a symbol time is scaled by a factor of 1/X relative to an existing symbol time; and
the bandwidth is scaled by X such that subcarrier frequency spacing is scaled by X relative to existing subcarrier frequency spacing.

* * * * *